US007006428B2

(12) United States Patent
Proctor, Jr. et al.

(10) Patent No.: US 7,006,428 B2
(45) Date of Patent: Feb. 28, 2006

(54) METHOD FOR ALLOWING MULTI-USER ORTHOGONAL AND NON-ORTHOGONAL INTEROPERABILITY OF CODE CHANNELS

(75) Inventors: James A. Proctor, Jr., Indialantic, FL (US); Pertti O. Alapuranen, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 538 days.

(21) Appl. No.: 09/898,514

(22) Filed: Jul. 3, 2001

(65) Prior Publication Data

US 2002/0009068 A1 Jan. 24, 2002

Related U.S. Application Data

(60) Provisional application No. 60/219,789, filed on Jul. 19, 2000.

(51) Int. Cl.
*H04J 11/00* (2006.01)

(52) U.S. Cl. ....................... 370/208; 370/335; 375/145

(58) Field of Classification Search ................ 370/204, 370/208, 209, 335, 342, 441; 375/140, 141, 375/145, 146

See application file for complete search history.

(56) References Cited

U.S. PATENT DOCUMENTS 5,414,728 A * 5/1995 Zehavi ....................... 375/142
6,044,074 A * 3/2000 Zehavi et al. ............... 370/350
6,091,760 A * 7/2000 Giallorenzi et al. ........ 375/140
6,240,292 B1 * 5/2001 Haberman et al. .......... 455/439
6,249,517 B1 * 6/2001 Roh et al. ................... 370/342
6,266,363 B1 * 7/2001 Hiramatsu .................. 375/141
6,456,612 B1 * 9/2002 Kim et al. .................. 370/342
6,563,808 B1 * 5/2003 Cox et al. ................... 370/335
6,590,889 B1 * 7/2003 Preuss et al. ............... 370/342

* cited by examiner

*Primary Examiner*—Wellington Chin
*Assistant Examiner*—Chirag Shah
(74) *Attorney, Agent, or Firm*—Hamilton, Brook, Smith & Reynolds, P.C.

(57) ABSTRACT

A technique for allowing a first and second group of users to share access to a communication channel such as a radio channel. A first group of users is typically a legacy group of users such as those using digital CDMA cellular telephone equipment. The second group of users are a group of data users that code their transmissions in different formats optimized for data functionalities. The first group of users share one modulation structure such as, on a reverse link, using unique phase offsets of a common pseudorandom noise (PN) code. The second group of users share another modulation structure but in a manner that is consistent and compatible with the users of the first group. Specifically, the users of the second group may all use the same PN code and code phase offset. However, they are uniquely identified such as, for example, assigning each of them a unique orthogonal code.

36 Claims, 3 Drawing Sheets

METHOD FOR ALLOWING MULTI-USER ORTHOGONAL AND NON-ORTHOGONAL INTEROPERABILITY OF CODE CHANNELS

RELATED APPLICATION(S)

This application claims the benefit of U.S. Provisional Application No. 60/219,789, filed on Jul. 19, 2000, the entire teachings of the above application(s) are incorporated herein by reference.

BACKGROUND OF THE INVENTION

The last twenty years have seen unprecedented growth in both the type and demand for wireless communication services. Wireless voice communication services, including cellular telephone, Personal Communication Services (PCS), and similar systems now provide nearly ubiquitous coverage. The infrastructure for such networks has been build-out to the point where most residents of the United States, Europe, and other industrialized regions of the world have not just one, but multiple service providers from which to choose.

Continued growth in the electronics and computer industries increasingly contributes to demand for access to the Internet and the myriad of services and features that it provides. This proliferation in the use of computing equipment, especially that of the portable variety, including laptop computers, handheld Personal Digital Assistants (PDAs), Internet-enabled cellular telephones and like devices, has resulted in a corresponding increase in the need for wireless data access.

While the cellular telephone and PCS networks are widely deployed, these systems were not originally intended for carrying data traffic. Instead, these networks were designed to efficiently support continuous analog signals as compared to the burst mode digital communication protocols needed for Internet communications. Consider also that voice communication is adequate with a communication channel bandwidth of approximately 3 kilohertz (kHz). However, it is generally accepted that for effective Internet communication, such as for Web browsing, a data rate of at least 56 kilobits per second (kbps) or higher is required.

In addition, the very nature of the data traffic itself is different from the nature of voice communication. Voice requires a continuous duplex connection, that is, the user at one end of a connection expects to be able to transmit and receive to the user at the other end of a connection continuously, while at the same time the user at the other end is also able to transmit and receive. However, access to Web pages over the Internet is, in general, very burst oriented. Typically, the user of a remote client computer specifies the address of computer files such as on a Web server. This request is then formatted as a relatively short data message, typically less than a 1000 bytes in length. The other end of the connection, such as at a Web server in the network, then replies with the requested data file which may be from 10 kilobytes to several megabytes of text, image, audio, or video data. Because of delays inherent in the Internet itself, users often expect delays of at least several seconds or more before the requested content begins to be delivered to them. And then once that content is delivered, the user may spend several seconds or even minutes reviewing, reading the contents of the page before specifying the next page to be downloaded.

Furthermore, voice networks were built to support high mobility usage; that is, extreme lengths were taken to support highway speed type mobility to maintain connections as the users of voice based cellular and PCS networks travel at high speeds along a highway. However, the typical user of a laptop computer is relatively stationary, such as sitting at a desk. Thus, the cell-to-cell high speed mobility considered critical for wireless voice networks is typically not required for supporting data access.

SUMMARY OF THE INVENTION

It would make sense to retrofit certain components of the existing wireless infrastructure to more efficiently accommodate wireless data. The additional functionality implemented for a new class of users who are high data rate, but low mobility users should be backwards compatible with existing functionality for users who are low data rate, high mobility. This would permit using the same frequency allocation plans, base station antenna, build out sites, and other aspects of the existing voice network infrastructure to be used to provide the new high speed data service.

It would be particularly important to support as high a data rate as possible on the reverse link of such a network that is carrying data on the reverse link, e.g., from the remote unit to the base station. Consider that existing digital cellular standards such as the IS-95 Code Division Multiple Access (CDMA) specify the use of different code sequences in a forward link direction in order to maintain minimum interference between channels. Specifically, such a system employs orthogonal codes on the forward link, which defines individual logical channels. However, the optimum operation of such a system requires all such codes to be time aligned to a specific boundary to maintain orthogonality at the receiver. Therefore, the transmissions must be synchronized.

This is not a particular concern in a forward link direction since all transmissions originate at the same location, i.e., at a base transceiver station location. However, currently, digital cellular CDMA standards do not attempt to use or require orthogonality between channels in reverse link direction. It is generally assumed that it is too difficult to synchronize transmissions originating from remote units located in different locations and at potentially quite different distances from the base station. Instead, these systems typically use a chip level scrambling code with unique shifts of this long pseudorandom code to distinguish the individual reverse link channels. Use of this scrambling however, thus precludes the possibility of different users' transmissions being orthogonal to one another.

The present invention is a system which supports communication among members of a first group of users and a second group of users. The first group of users, which may be legacy users of a digital Code Division Multiple Access (CDMA) cellular telephone system, encode their transmissions with a common first code. Such first group of users are uniquely identifiable by providing a unique code phase offset for each user. The second group of users, who may be users of a high speed data service, encode their transmissions using the same code and one of the code phase offsets of that code. However, each of the users of the second group further encode their transmissions with an additional code, the additional code being unique for each of the users of the second group. This permits the transmissions of the second group of users to be orthogonal to each other while still maintaining the appearance of collectively being a single user of the first group.

The code assigned to the first group of users may be a common chipping rate, pseudorandom code. The code assigned to the second group of terminals may typically be a set of unique orthogonal codes. The individual members of the first group of terminals may be distinguished by scrambling codes that have unique phase offsets of a selected longer pseudorandom noise sequence.

In a preferred embodiment, certain steps are taken to ensure proper operation of the signaling among the second group of users or so-called "heartbeat." Specifically, a common code channel may be dedicated for use as a synchronization channel. This permits the maintenance of proper timing of the transmissions of the second group of terminals if, for example, the coding scheme is implemented in a reverse link direction.

In another embodiment, the user of the second group may be allocated specific time slots in which to transmit and therefore maintain the orthogonality through the use of time division multiple access. Again, the point is that the users of the second group collectively appear as a single user to the transmissions of the users in the first group.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
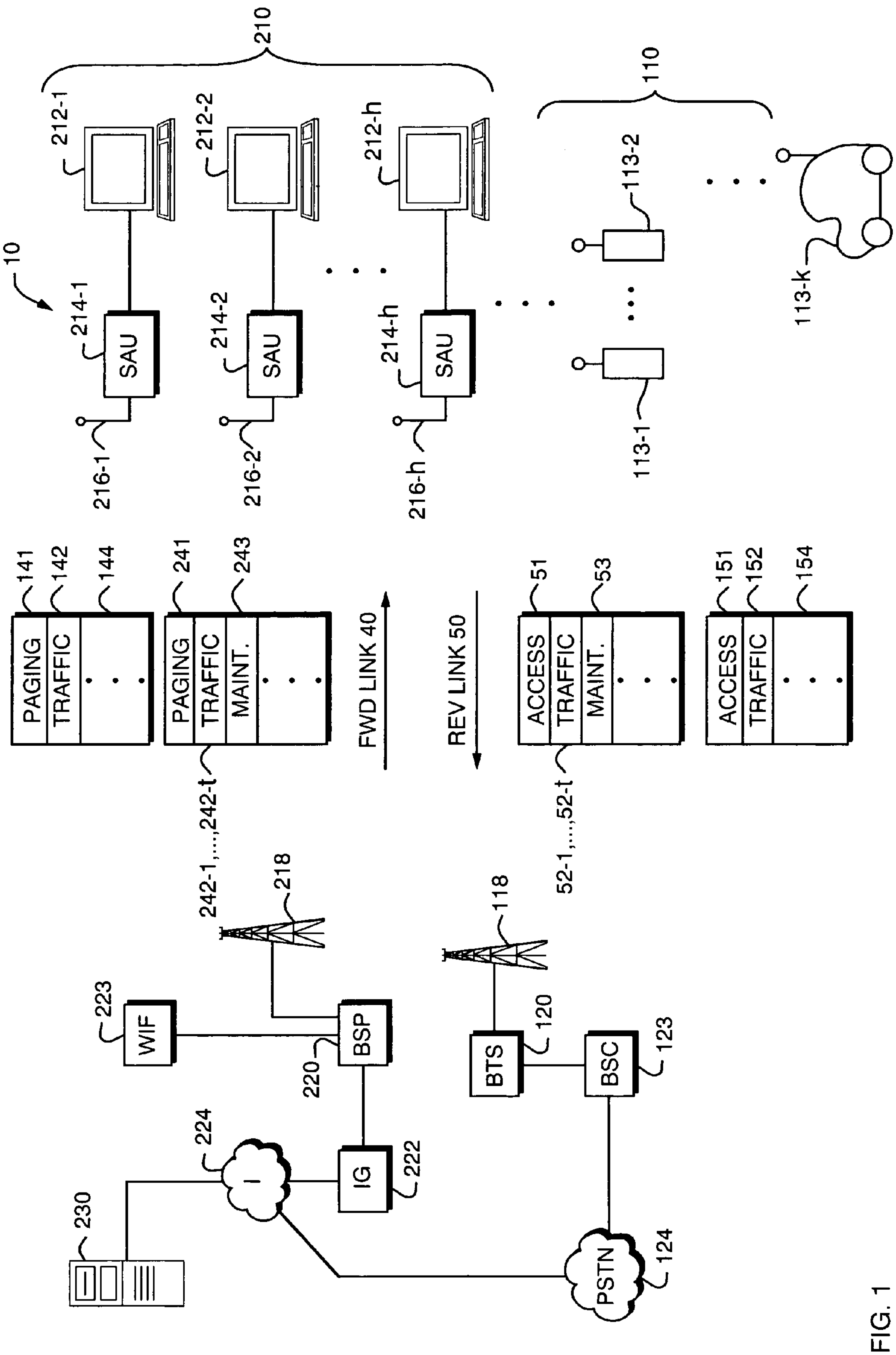
FIG. 1 is a block diagram of a system which employs two different types of channel encoding according to the invention.

FIG. 1 is a block diagram of a Code Division Multiple Access (CDMA) communication system 10 that makes use of a signal encoding scheme in which a first class of logical channels are assigned unique long codes with different code phase offsets, and a second class of logical channels are provided by using a common code and common code phase offset, combined with an additional coding process using a unique orthogonal code for each channel.

In the following detailed description of a preferred embodiment, the communication system 10 is described such that the shared channel resource is a wireless or radio channel. However, it should be understood that the techniques described here can be applied to implement shared access to other types of media such as telephone connections, computer network connections, cable connections, and other physical media to which access is granted on a demand driven basis.

The system 10 supports wireless communication for a first group of users 110 as well as a second group of users 210. The first group of users 110 are typically legacy users of cellular telephone equipment such as wireless handsets 113-1, 113-2, and/or cellular mobile telephones 113-h installed in vehicles. This first group of users 110 principally use the network in a voice mode whereby their communications are encoded as continuous transmissions. In a preferred embodiment, these users' transmissions are forwarded from the subscriber units 113 through forward link 40 radio channels and reverse link 50 radio channels. Their signals are managed at a central location that includes a base station antenna 118, base transceiver station (BTS) 120, base station controller (BSC) 123. The first group of users 110 are therefore typically engaged in voice conversations using the mobile subscriber units 113, BTS 120, and BSC 123 to connect telephone connections through the Public Switch Telephone Network (PSTN) 124.

The forward link 40 in use by the first group of users may be encoded according to well known digital cellular standards such as this Code Division Multiple Access (CDMA) standard defined in IS-95B specified by the Telecommunications Industry Association (TIA). This forward link 40 includes at least a paging channel 141 and traffic channel 142, as well as other logical channels 144. These forward link 40 legacy channels 141, 142, 144 are defined in such a system by using orthogonally coded channels. These first group of users 110 also encode their transmissions over the reverse link 50 in accordance with the IS-95B standard. They therefore make use of several logical channels in a reverse link 50 direction, including an access channel 151, traffic channel 152, and other logical channels 154. In this reverse link 50, the first group of users 110 typically encode the signals with a common long code using different code phase offsets. The manner of encoding signals for the legacy users 110 on the reverse link 50 is also well known in the art.

The communication system 10 also includes a second group of users 210. This second group of users 210 are typically users who require high speed wireless data services. Their system components include a number of remotely located Personal Computer (PC) devices 212-1, 212-2, . . . 212-h, . . . 212-1, corresponding remote Subscriber Access Units (SAUs) 214-1, 214-2, . . . 214-h, . . . 214-1, and associated antennas 216-1, 216-2, . . . 216-h, . . . 216-1. Centrally located equipment includes a base station antenna 218, and a Base Station Processor (BSP) 220. The BSP 220 provides connections to an from an Internet gateway 222, which in turn provides access to a data network such as the Internet 224, and network file server 230, and to wireless interworking function (WIF) 223.

The PCs 212 may transmit data to and receive data from network server 230 through bi-directional wireless connections implemented over the forward link 40 and reverse link 50 used by the legacy users 110. It should be understood that in a point to multi-point multiple access wireless communication system 10 as shown, a given base station processor 220 supports communication with a number of different active subscriber access units 214 in a manner which is similar to a cellular telephone communication network.

In the present scenario, the radio frequencies allocated for use by the first group 110 are the same as those allocated for use by the second group 210. The present invention is specifically concerned with how to permit a different encoding structure to be used by the second group 210 while creating minimal interference to the first group 110.

The PCs 212 are typically laptop computers 212-1, handheld units 212-h, Internet-enabled cellular telephones or Personal Digital Assistant (PDA) type computing devices. The PCs 212 are each connected to a respective SAU 214 through a suitable wired connection such as an Ethernet-type connection.

An SAU 214 permits its associated PC 212 to be connected to the network file server 230 through the BSP 220, gateway 222 and network 224. In the reverse link direction, that is, for data traffic traveling from the PC 212 towards the server 230, the PC 212 provides an Internet Protocol (IP)

level packet to the SAU 214. The SAU 214 then encapsulates the wired framing (i.e., Ethernet framing) with appropriate wireless connection framing and encoding. The appropriately formatted wireless data packet then travels over one of the radio channels that comprise the reverse link 50 through the antennas 216 and 218. At the central base station location, the BSP 220 then extracts the radio link framing, reformatting the packet in IP form and forwards it through the Internet gateway 222. The packet is then routed through any number and/or any type of TCP/IP networks, such as the Internet 224, to its ultimate destination, such as the network file server 230.

Data may also be transmitted from the network file server 230 to the PCs 212 in a forward link 40 direction. In this instance, an Internet Protocol (IP) packet originating at the file server 230 travels through the Internet 224 through the Internet gateway 222 arriving at the BSP 220. Appropriate wireless protocol framing and encoding is then added to the IP packet. The packet then travels through the antenna 218 and 216 to the intended receiver SAU 214. The receiving SAU 214 decodes the wireless packet formatting, and forwards the packet to the intended PC 212 which performs the IP layer processing.

A given PC 212 and the file server 230 can therefore be viewed as the end points of a duplex connection at the IP level. Once a connection is established, a user at the PC 212 may therefore transmit data to and receive data from the file server 230.

From the perspective of the second group of users 210, the reverse link 50 actually consists of a number of different types of logical and/or physical radio channels including an access channel 51, multiple traffic channels 52-1, . . . 52-t and a maintenance channel 53. The reverse link access channel 51 is used by the SAUs 214 to send messages to the BSP 220 to request that traffic channels be granted to them. The assigned traffic channels 52 then carry payload data from the SAU 214 to the BSP 220. It should be understood that a given IP layer connection may actually have more than one traffic channel 52 assigned to it. In addition, a maintenance channel 53 may carry information such as synchronization and power control messages to further support transmission of information over the reverse link 50.

Similarly, the second group of users have a forward link 40 that includes a paging channel 241, multiple traffic channels 242-1 . . . 242-t, and maintenance channel 243. The paging channel 241 is used by the BSP 220 to not only inform the SAU 214 that forward link traffic channels 242 have been allocated to it, but also to inform the SAU 214 of allocated traffic channels 52 in the reverse link direction. Traffic channels 242-1 . . . 242-t on the forward link 40 are then used to carry payload data information from the BSP 220 to the SAUs 214. Additionally, maintenance channels 243 carry synchronization and power control information on the forward link 40 from the base station processor 220 to the SAUs 214. It should be understood that there are typically many more traffic channels 241 than paging channels 241 or maintenance channels 243.

In the preferred embodiment, the logical forward link channels 241, 242, and 243 and reverse link channels 51, 52, and 53 are defined by assigning each channel a pseudorandom noise (PN) channel code. The system 10 is therefore a so-called Code Division Multiple Access (CDMA) system in which multiple coded channels may use the same radio frequency (RF) channel. The logical or code channels may also be further divided or assigned among multiple active SAUs 214.

The sequence of signal processing operations is typically performed to encode the respective reverse link 50 logical channels 51, 52, and 53. In the reverse link direction, the transmitter is one of the SAUs 214 and the receiver is the Base Station Processor (BSP) 220. The preferred embodiment of the invention is implemented in an environment where legacy users of a CDMA digital cellular telephone system such as one operating in accordance with the IS-95B standard are also present on the reverse link 50. In an IS-95B system, reverse link CDMA channel signals are identified by assigning non-orthogonal pseudorandom noise (PN) codes.

Figure 2:
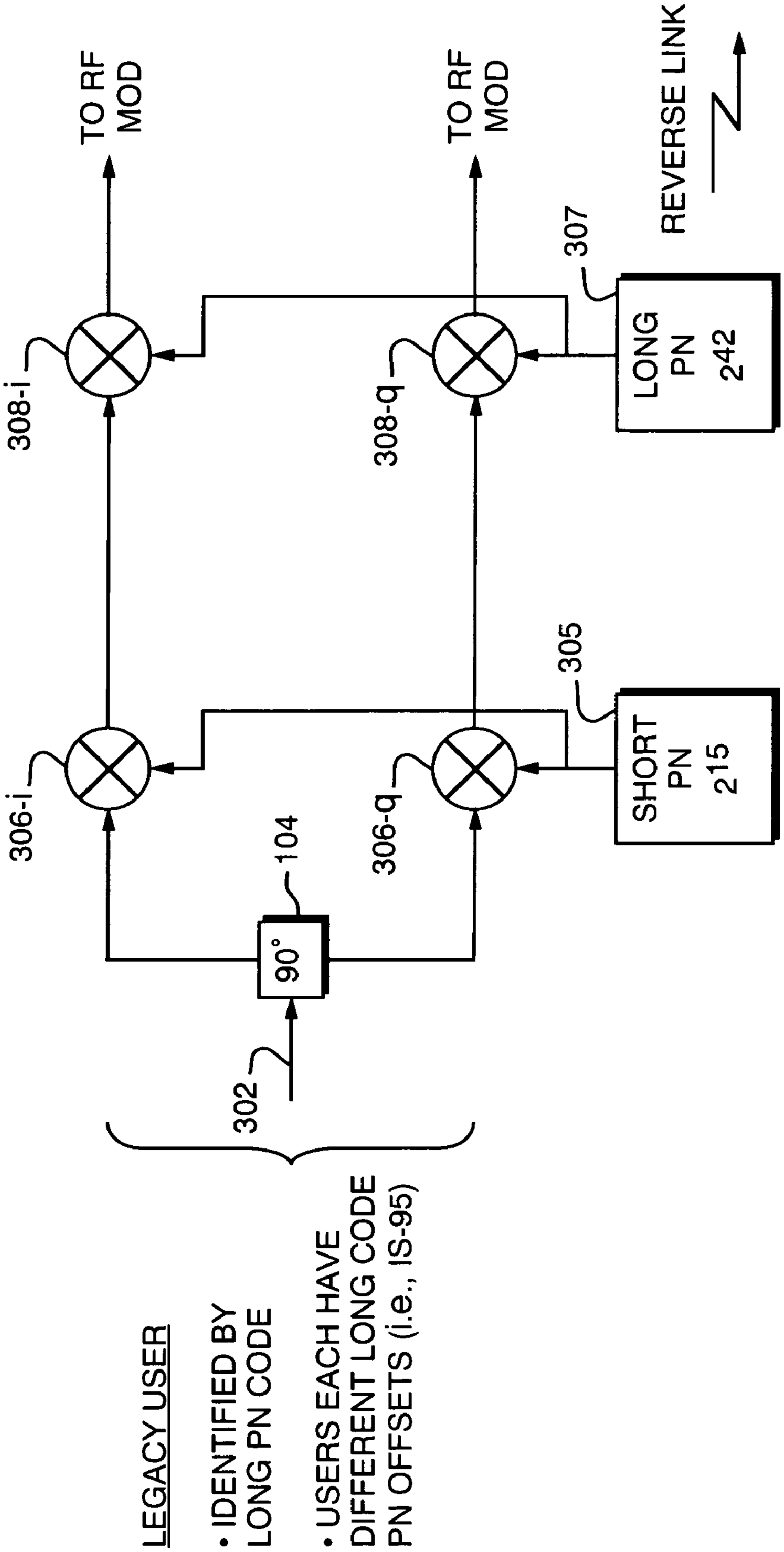
FIG. 2 is a more detailed diagram of a channel encoding process for a first class of users.

Turning attention now to FIG. 2, the channel encoding process for the first group of legacy users 110 will be described in greater detail. This first class of users includes, for example, digital CDMA cellular telephone system users that encode signals according to the IS-95B standard as mentioned above. The individual channels are therefore identified by modulating the input digitized voice signal by a pseudorandom noise (PN) code sequence for each channel. Specifically, the channel encoding process takes an input digital signal 302 that represents the information to be transmitted. A quadrature modulator 304 provides an in-phase (i) and quadrature (q) signal path to a pair of multipliers 306-i and 306-q. A short pseudorandom noise (PN) code generator 305 provides a short (in this case a $2^{15}-1$ or 32767 bit) length code used for spectrum spreading purposes. The short code typically therefore is the same code for each of the logical channels for the first group 110.

A second code modulation step is applied to the (i) and (q) signal paths by multiplying the two signal paths with an additional long PN code. This is accomplished by the long code generator 307 and the long code multipliers 308-i and 308-q. The long code serves to uniquely identify each user on the reverse link 50. The long code may be a very long code, which, for example, only repeats every $2^{42}-1$ bits. The long code is applied at the short code chipping rate, e.g., one bit of the long code is applied to each bit output by the short code modulation process, so that further spectrum spreading does not occur.

Individual users are identified by applying different phase offsets of the PN long code to each user.

It should be understood that other synchronization steps need not be taken for the first group of users 110. Specifically, these transmissions on the reverse link 50 are designed to be asynchronous and therefore are not necessarily perfectly orthogonal.

Figure 3:
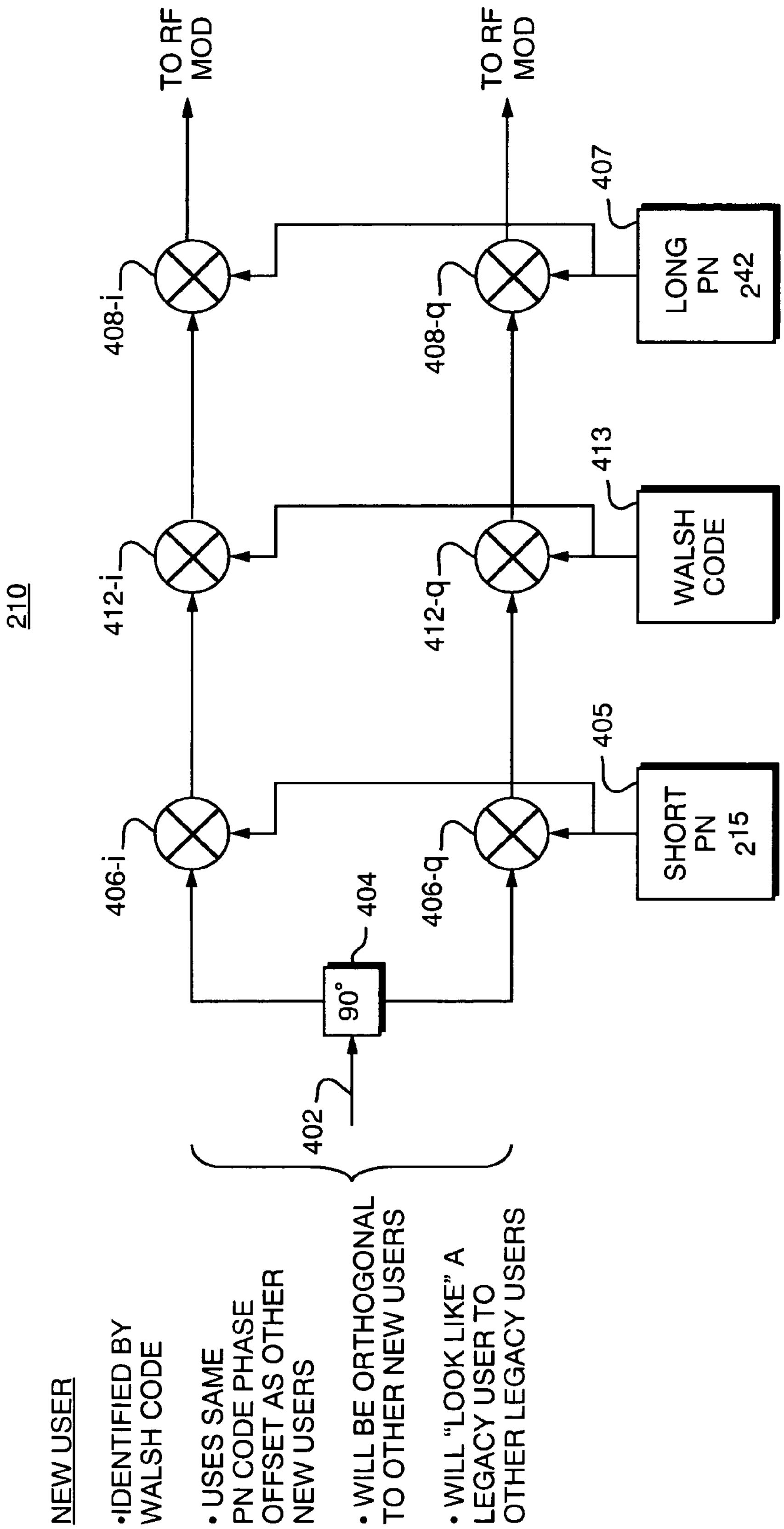
FIG. 3 is a more detailed diagram of a channel encoding process for a second class of users.

FIG. 3 is a more detailed view of the channel encoding process for the second group of users 210. This second group 210, for example, includes wireless data users that encode signals according to a format optimized for data transmission.

The individual channels are identified by modulating the input data by a pseudorandom noise (PN) code sequence that is the same code sequence used for the first group of users 110. However, as will be understood shortly, the channels in the second group 210 are uniquely identified by specific orthogonal codes such as Walsh codes. Specifically, the channel encoding process for this second group of users 210 takes an input digital signal 402 and applies a number of codes as generated by a short code generator 405, Walsh code generator 413, and long code generator 407.

As a first step, a quadrature modulator 404 provides an in-phase (i) and quadrature (q) signal path to a first pair of multipliers 406-i and 406-q. The short pseudorandom noise (PN) code generator 405 provides a short, in this case, a $2^{15}$ length code used for spectrum spreading purposes. This short code therefore is the same as the short PN code used for each of the channels in the first group 110.

A second step in the process is to apply an orthogonal code such as generated by the Walsh code generator 413. This is accomplished by the multipliers 412-i and 412-q impressing the orthogonal code on each of the in-phase and quadrature signal paths. The orthogonal code assigned to each logical channel is different, and uniquely identifies such channels.

In a final step of the process, a second pseudorandom noise (PN) long code is applied to the (i) and (q) signal paths. The long code generator 407 thus forwards the long code to a respective one of the in-phase 408-i and quadrature 408-q multipliers. This long code does not uniquely identify each user in the second group 210. Specifically, this code may be one of the very same long codes that are used in the first group that uniquely identify their first group of users 110. Thus, for example, it is applied in the same manner as a short code chipping rate code so that one bit of the long code is applied to each bit output by the short code modulation process. In this manner, all of the users in the second group 210 appears as a single legacy user of the first group 110. However, the users of the second group 210 may be uniquely identified given that they have been assigned unique orthogonal Walsh codes.

As the implementation in the preferred embodiment is on a reverse link 50, additional information must be provided in order to maintain orthogonality among the various users in the second group 210. Specifically, a maintenance channel 243 is therefore included in the forward link 40. This maintenance or "heartbeat" channel provides synchronization information and/or other timing signals so that the remote units 214 may synchronize their transmissions appropriately. The maintenance channel may be time slotted. For more details of the formatting of this forward link maintenance channel 243, reference can be had to a co-pending U.S. patent application Ser. No. 09/775,305 filed Feb. 1, 2001 entitled "MAINTENANCE LINK USING ACTIVE/STANDBY REQUEST CHANNELS," which is hereby incorporated by reference in its entirety.

It should be understood that certain infrastructure may therefore be shared by both the second group of users 210 and first group of users 110. For example, the antennas 218 and 118 although shown as separate base station antennas in FIG. 1 may indeed be a shared antenna. Likewise, the location for the antennas may therefore be the same. This permits the second group of users 210 to share equipment and physical build-out locations already in place and in use by the legacy users 110. This greatly simplifies the deployment of wireless infrastructure for this new group of users 210, for example, new locations and new antenna sites need not be built out.

What is claimed is:

1. In a system which supports code division multiple access communication among members of a first group of terminals and among a second group of terminals, a method comprising the steps of:

- assigning to the first group of terminals a first code, each user of the first group being uniquely identifiable by a unique code phase offset;
- assigning to the second group of terminals the same code as used by the first group but each user of the second group using another code that is not unique to each user of the second group; and
- assigning to each user of the second group an additional code, the additional code being unique for each of the terminals of the second group.

2. A method as in claim 1 wherein the code assigned to the first group of terminals is a common chipping rate code.

3. A method as in claim 1 wherein the additional codes assigned to the second group of terminals are a set of unique, orthogonal codes.

4. A method as in claim 1 wherein the code assigned to each one of the first group of terminals is a unique, non-orthogonal scrambling sequence.

5. A method as in claim 1 wherein the first group of terminals uses scrambling codes that are unique phase shifts of a larger pseudorandom noise sequence.

6. A method as in claim 1 wherein the second group of terminals use additional codes that are a set of unique orthogonal codes.

7. A method as in claim 6 wherein the unique orthogonal code is used to scramble the transmissions of the second group of terminals at an indicated chip rate.

8. A method as in claim 7 wherein the transmission timing for the second group of terminals is synchronized to allow transmissions from the second group of terminals to be orthogonal to one another.

9. A method as in claim 1 wherein the two groups of terminals employ radio frequency modulation that is different from each other.

10. A method as in claim 1 wherein the two groups of terminals employ the codes in different spreading techniques.

11. A method as in claim 10 wherein the first group of terminals uses pairs of the codes as respective inputs to an in-phase and quadrature modulator.

12. A method as in claim 10 wherein the second group of terminals use the assigned additional codes as short scrambling codes.

13. A method as in claim 1 wherein a first group of terminals receives periodic timing adjustment information over a first link direction to provide for timing adjustment for a second link direction.

14. A method as in claim 13 wherein the second group of terminals do not receive such periodic timing adjustment information.

15. A method as in claim 1 wherein the second group of terminals use an additional code which is a short length orthogonal code.

16. A method as in claim 1 wherein the second group of terminals use an additional code which is a short length, bit augmented pseudorandom noise sequence.

17. A method as in claim 1 wherein the codes assigned to the first group of terminals and the additional codes assigned to the second group of terminals are used to encode transmissions on a reverse communication link between remotely located wireless terminals and a centrally located wireless base station.

18. A method as in claim 1 wherein the first group of terminals are legacy cellular telephone terminals.

19. A method as in claim 18 wherein the first group of terminals are assigned codes according to a CDMA cellular telephone standard specification.

20. A method as in claim 19 wherein the CDMA cellular telephone standard specification is selected from the group consisting of IS-95 and CDMA-2000.

21. A method as in claim 18 wherein the second group of terminals are used in a wireless data communication system.

22. A method as in claim 21 wherein the additional codes assigned to the second group of terminals are a set of common chip rate scrambling codes.

23. A method as in claim 22 wherein the additional codes are scrambling codes that repeat every N chips, where N is an even number in a range from 128 to 32768 chips.

24. A wireless communication system comprising a first set of access units and a second set of access units, the first set of access units and the second set of access units capable of communicating with a central base station wherein the first set of access units use a chip rate scrambling code to separate their user channels, each individual unit of the first set of access units having at least one unique, non-orthogonal scrambling sequence that is selected from a unique phase shift of a longer pseudorandom noise sequence, and wherein the second group of access units share a chip rate scrambling code derived from a phase shift of the longer pseudorandom noise sequence that is not used by the first group of access units.

25. The wireless communication system of claim 24 wherein each unit of the second set is assigned at least one unique orthogonal code.

26. The wireless communication system of claim 24 wherein the chip rate transmissions of the second set of access units are scrambled by the bits of the orthogonal code at a chipping rate.

27. The wireless communication system of claim 24 wherein the transmission timing of the second set of access units is controlled such that their transmissions are orthogonal to each other.

28. The wireless communication system of claim 24 wherein the scrambling code is $2^{42}$ chips in length.

29. The wireless communication system of claim 24 wherein the first set of access units and the second set of access units employ different modulation techniques.

30. The wireless communication system of claim 24 wherein the first set of access units and the second set of access units employ different spreading techniques.

31. The wireless communication system of claim 30 wherein the first set of access units employ complex in-phase and quadrature spreading.

32. The wireless communication system of claim 31 wherein the complex in-phase and quadrature spreading uses two different scrambling codes.

33. The wireless communication system of claim 32 wherein the two different scrambling codes are $2^{15}$ in length.

34. The wireless communication system of claim 32 wherein the two different scrambling codes comprise an in-phase (I) code and a quadrature (Q) code.

35. The wireless communication system of claim 31 wherein the second set of access units use a scrambling code that is $2^{15}$ in length.

36. The wireless communication system of claim 24 wherein the access units are using the assigned codes to format signals for a reverse link communication signal.

* * * * *